C. MORROW.
NUT LOCK.
APPLICATION FILED APR. 22, 1916.
1,202,565.
Patented Oct. 24, 1916.
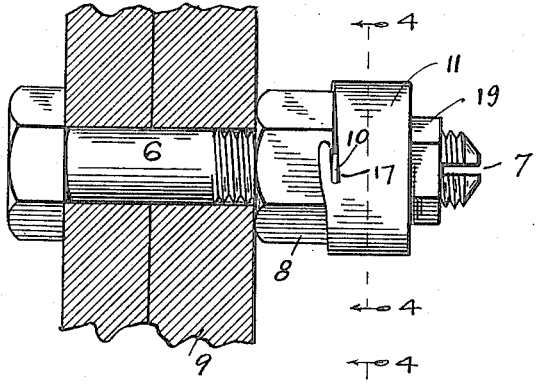
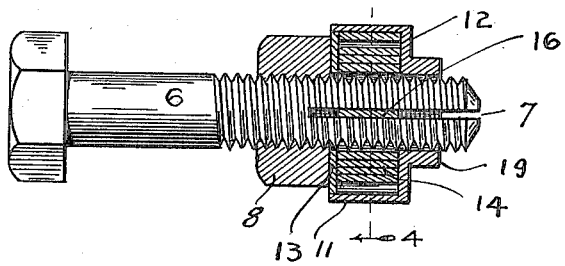
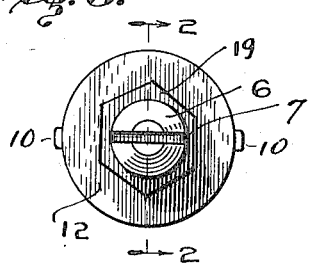
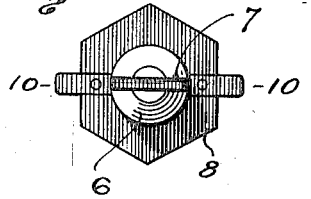
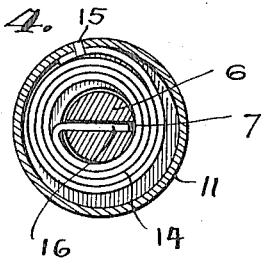
Inventor,
Charles Morrow,
By Minturn & Woerner,
Attorneys.

UNITED STATES PATENT OFFICE.

CHARLES MORROW, OF INDIANAPOLIS, INDIANA, ASSIGNOR OF ONE-HALF TO JESSE H. JONES, OF INDIANAPOLIS, INDIANA.

NUT-LOCK.

1,202,565.   Specification of Letters Patent.   Patented Oct. 24, 1916.

Application filed April 22, 1916. Serial No. 92,947.

*To all whom it may concern:*

Be it known that I, CHARLES MORROW, a citizen of the United States, residing at Indianapolis, in the county of Marion and State of Indiana, have invented certain new and useful Improvements in Nut-Locks, of which the following is a specification.

The object of this invention is to provide a nut lock which, besides keeping a nut to which it is applied, from working loose on its bolt, will tighten the nut automatically thereon, and a further object is to provide a lock which can be slipped off of the bolt without being rotated, so as to release the nut when the nut is to be removed.

I accomplish the above, and other objects which will hereinafter appear, by the mechanism illustrated in the accompanying drawing, in which—

Figure 1 is an elevation of a bolt and nut, with my invention applied thereto. Fig. 2 is a similar view of the bolt, but showing the nut and lock in section on the line 2—2 of Fig. 3. Fig. 3 is a view looking at the nut-lock and that end of the bolt to which the lock is applied. Fig. 4 is a cross-section on the line 4—4 of Figs. 1 and 2, and Fig. 5 is a view similar to Fig. 3, with the lock removed.

Like characters of reference indicate like parts throughout the several views of the drawing.

The bolt 6 is of usual construction except that it is provided at its threaded end with a longitudinal and diametrical slot 7. Upon the threaded end of the bolt a nut 8 is screwed in the usual way firmly against the work 9. This nut is of usual construction with the exception of the addition of a pair of lugs 10, which project from diametrically opposite sides of the nut.

A cylinder 11, with an outer and preferably integral head 12, and a removable head 13 at its opposite or inner end, comprise a housing. Both of these heads have central openings of ample diameter to receive the bolt therethrough with a sliding fit.

A spiral spring 14 is contained within the housing and has one end fastened by a rivet 15 to the cylinder, while the other end 16 is bent diametrically across the inner convolution in the manner shown. When the housing is assembled on the bolt the end 16 enters the slot 7 in the bolt. The inner edge of the cylinder is notched somewhat obliquely on two diametrically opposite sides 17, to receive the corresponding lugs 10 of the nut.

The head 12 of the housing has an outside hub with faces to engage a wrench used in rotating the device to wind up the spring. This hub is shown at 19.

The operation is as follows: After the bolt 6 is placed the nut 8 is screwed on tight in the usual manner. The lock is next slipped on against the nut with the bolt passing through the opening in both heads 11 and 12, and the spring-end 16 entering the slot 7 in the bolt. Then the spring is wound up by turning it with a wrench applied to the hub 19, the tension of the spring being held by the lugs 10 entering the oblique slots 17. When the hub 19 is released by the wrench the tension of the spring by reason of said connection between the lock and the nut tends to screw the nut on, immediately taking up all looseness that may develop and effectually locking the nut. When it is desired to release the nut the lock is turned back until the lugs 10 are out of slots 17, whereupon the lock may be slid off the bolt.

Having thus fully described my invention what I claim as new and wish to secure by Letters Patent of the United States, is—

1. The combination with a threaded bolt slotted longitudinally at its threaded end, a nut screwing on the threaded end of the bolt, a spring-housing sliding on the bolt, a spring attached at its outer end to the housing and having its inner end bent to enter the slot in the bolt and means for drivingly connecting the housing with the nut.

2. The combination with a threaded bolt slotted longitudinally at its threaded end, a nut screwing on the threaded end of the bolt, a spring housing sliding on the bolt, a spring attached at its outer end to the housing and having its inner end bent to enter the slot in the bolt, said nut having lateral lugs and said housing having marginal slots which receive the lugs when the housing is driven by the spring.

In witness whereof, I, have hereunto set my hand and seal at Indianapolis, Indiana, this 20th day of March, A. D. one thousand nine hundred and sixteen.

CHARLES MORROW. [L. S.]

Copies of this patent may be obtained for five cents each, by addressing the "Commissioner of Patents, Washington, D. C."